(12) United States Patent
Alexander

(10) Patent No.: US 6,510,512 B1
(45) Date of Patent: Jan. 21, 2003

(54) METHOD AND SYSTEM FOR EXECUTING BIOS CODE IN SECURE MULTITASKING OPERATING ENVIRONMENT

(75) Inventor: Marc D. Alexander, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/234,435

(22) Filed: Jan. 20, 1999

(51) Int. Cl.[7] ............................................. G06F 9/445
(52) U.S. Cl. ......................................................... 713/2
(58) Field of Search ........................................ 713/1, 2

(56) References Cited

U.S. PATENT DOCUMENTS

| | | | |
|---|---|---|---|
| 4,926,476 A | 5/1990 | Covey | 380/4 |
| 5,675,771 A | 10/1997 | Curley et al. | 395/500 |
| 5,684,875 A | 11/1997 | Ellenberger | 482/4 |
| 5,694,582 A | 12/1997 | Pearce | 395/500 |
| 5,748,877 A | 5/1998 | Dollahite et al. | 395/183.12 |
| 5,805,880 A * | 9/1998 | Pearce et al. | 713/2 |
| 5,913,057 A * | 6/1999 | Labatte et al. | 713/2 |
| 5,919,257 A * | 7/1999 | Trostle | 713/200 |
| 6,112,303 A * | 8/2000 | Stancil | 713/2 |
| 6,148,387 A * | 11/2000 | Galasso et al. | 711/203 |

OTHER PUBLICATIONS

Waite et al., Soul of CP/M, 1983, pp. 279–322.*

* cited by examiner

*Primary Examiner*—Dennis M. Butler
(74) *Attorney, Agent, or Firm*—Baker Botts L.L.P.

(57) ABSTRACT

A computer system for executing BIOS code on a secure operating system, the computer system including a processor, memory coupled to the processor, at least one nonvolatile storage device, such as a hard disk drive, a BIOS file stored on the nonvolatile storage device, and a computer program executable by the processor wherein the computer program is capable of locating BIOS code within the BIOS file and copying the BIOS code to an executable program file stored on the nonvolatile storage device which is executed by the processor. Also, a method of executing BIOS code on a secure operating system that locates the BIOS code within at least one BIOS file, copies the BIOS code to an executable file, and executes the resulting executable file on a processor.

18 Claims, 3 Drawing Sheets

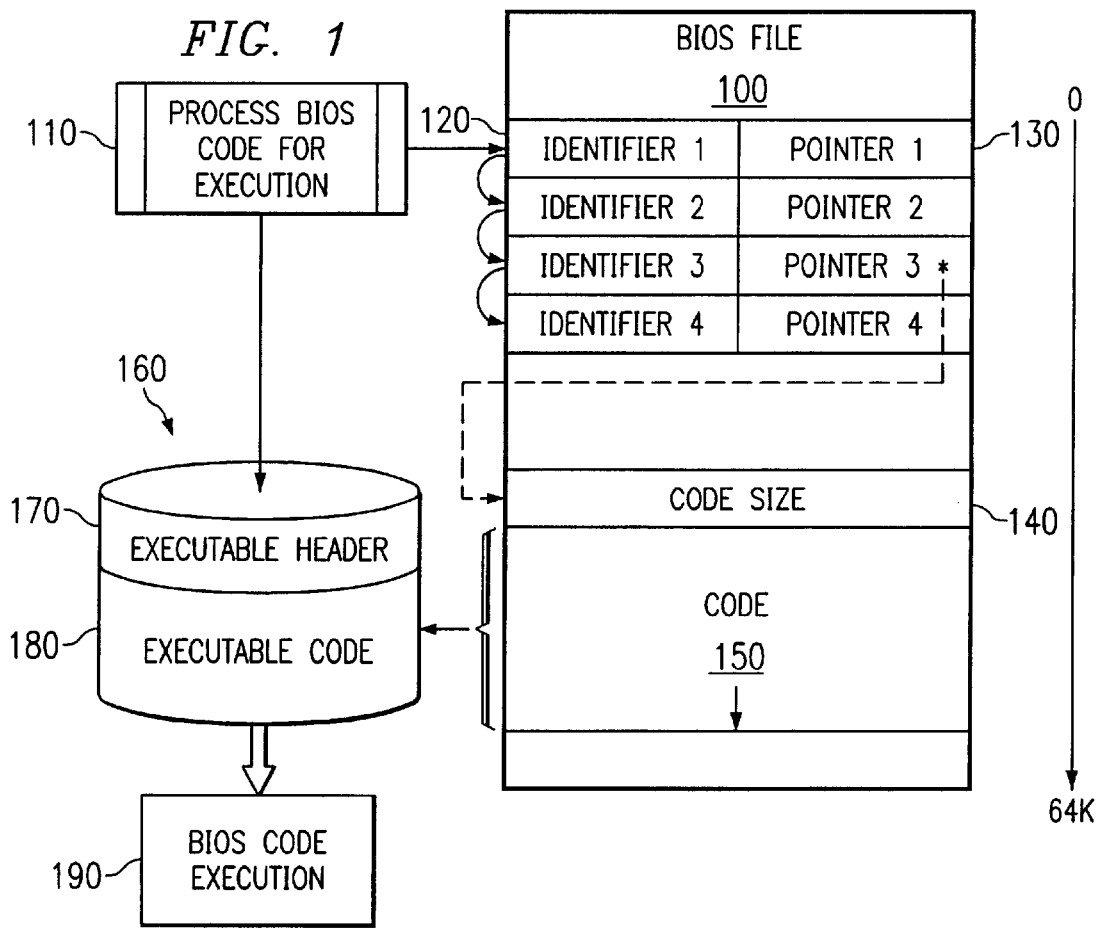
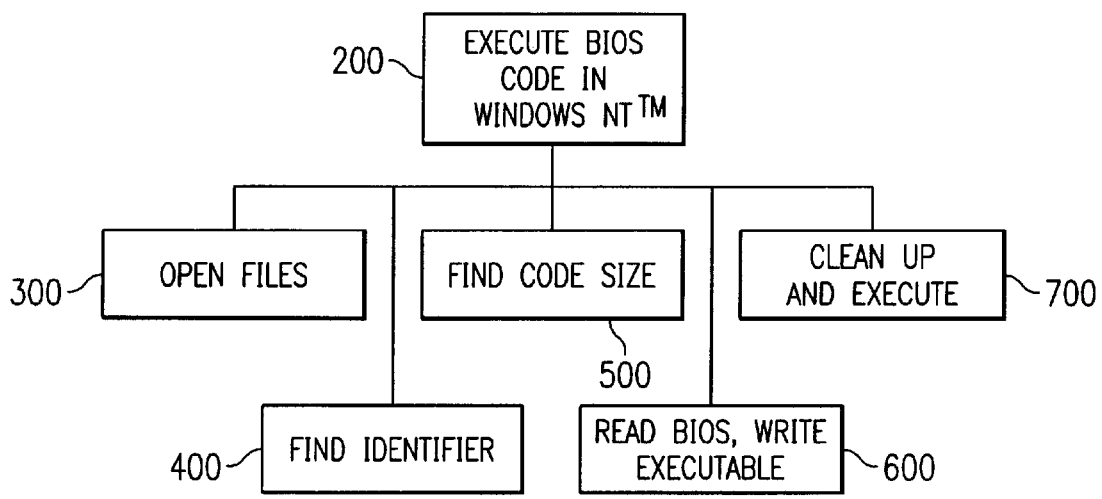

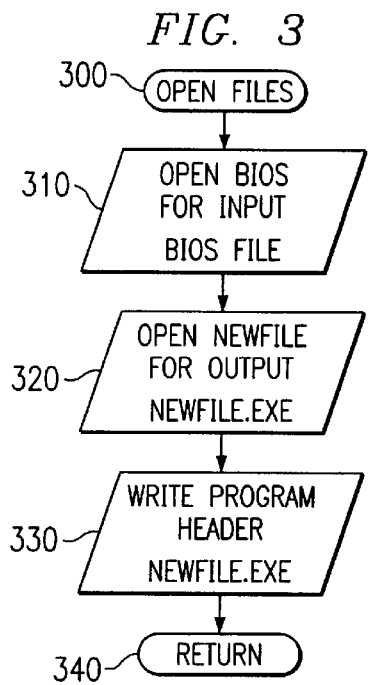
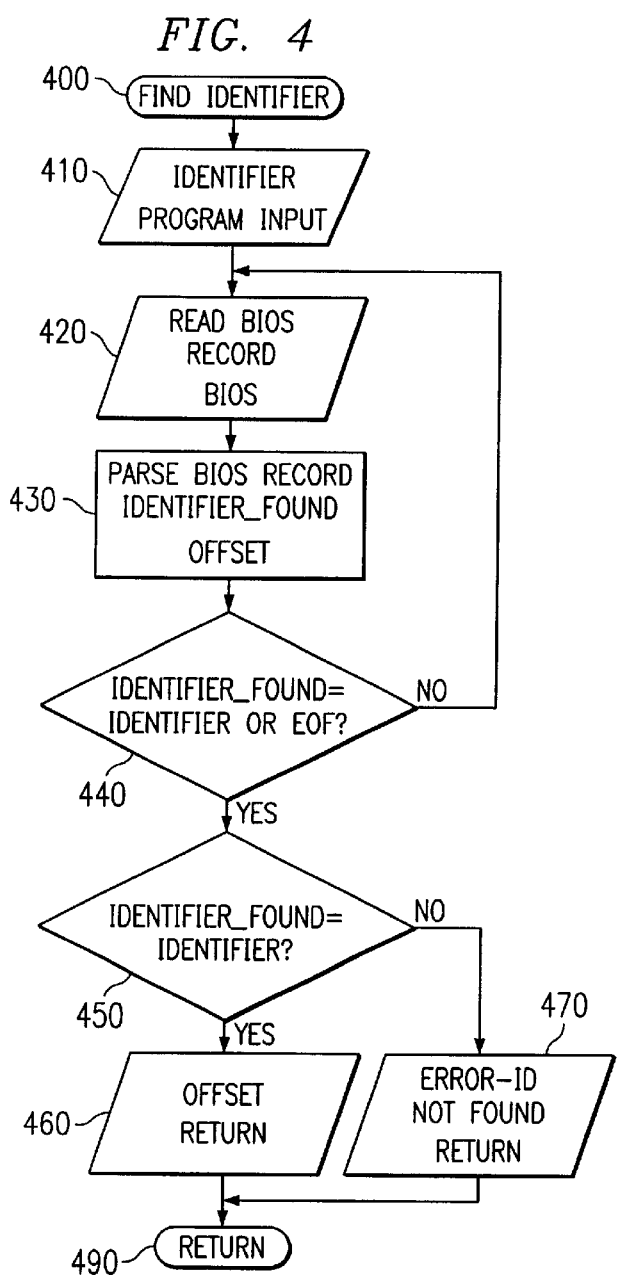
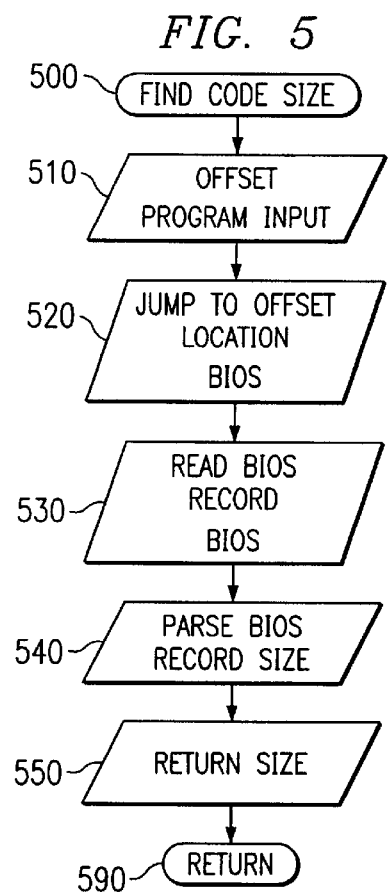

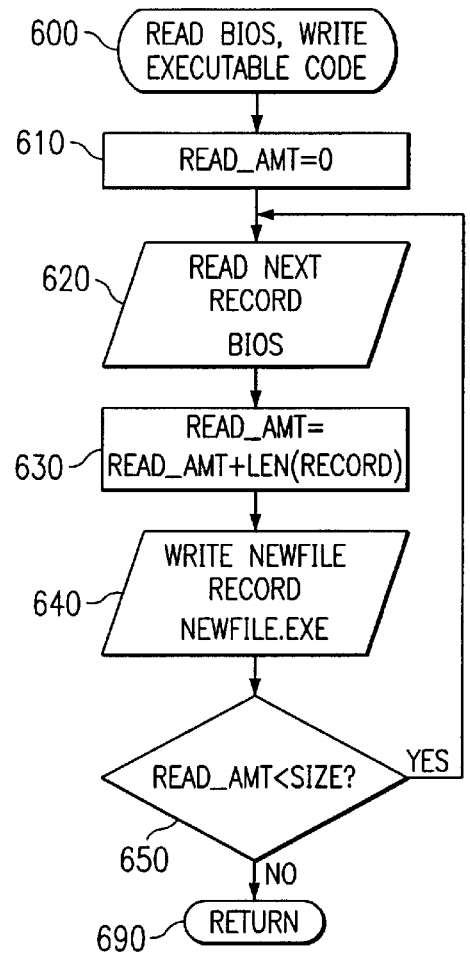
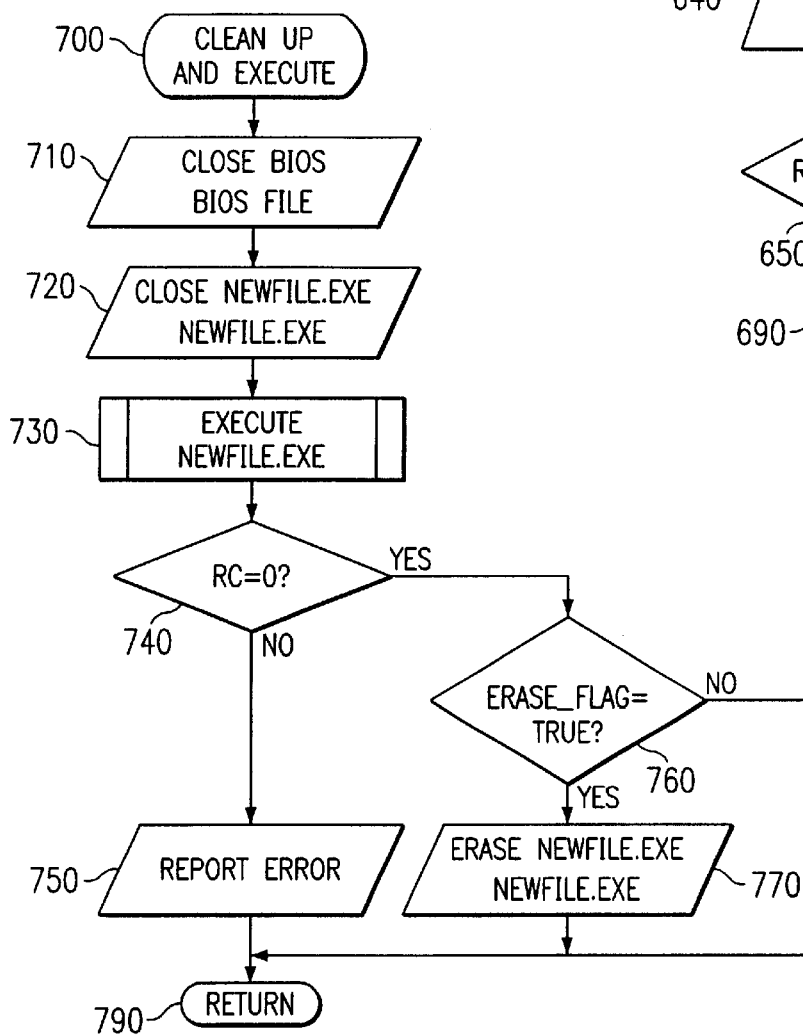

METHOD AND SYSTEM FOR EXECUTING BIOS CODE IN SECURE MULTITASKING OPERATING ENVIRONMENT

BACKGROUND

1. Field

This field relates to computer software for execution of BIOS code from a secure, multitasking operating environment, such as Microsoft Windows NT™.

2. Description of the Related Art

Computer systems in general and International Business Machines (IBM) compatible personal computer systems in particular have attained widespread use for providing computer power to many segments of today's modern society. A personal computer system can usually be defined as a desk top, floor standing, or portable microcomputer that includes a system unit having a system processor and associated volatile and non-volatile memory, a display monitor, a keyboard, one or more diskette drives, a fixed disk storage device and an optional printer. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses. A personal computer system may also include one or a plurality of I/O devices (i.e. peripheral devices) which are coupled to the system processor and which perform specialized functions. Examples of I/O devices include modems, sound and video devices or specialized communication devices. Mass storage devices such as hard disks, CD-ROM drives and magneto-optical drives are also considered to be peripheral devices. Operating systems have evolved from single user, single task operating systems, such as MS-DOS (for Microsoft Disk Operating System), to single user, multitasking operating systems, such as Microsoft Windows NT™.

BIOS Use Under MS-DOS

MS-DOS uses BIOS (basic input/output system) to manage many basic operations of the system. During system initialization, or "boot," a check is made of the hardware components before control is passed to a ROM BIOS boot program which typically checks the floppy drive ("drive A") to see if it contains a formatted diskette. If drive A does not contain a formatted diskette, the ROM BIOS checks the fixed disk drive ("drive C") to see if it is formatted. When a formatted disk is found, the ROM BIOS reads two hidden system files found on the disk—an input/output system file (IO.SYS or IBMBIO.COM) and a disk operating system file (MSDOS.SYS or IBMDOS.COM). The IO.SYS file is loaded into RAM and includes a system initialization routine (SYSINIT) that performs the remaining boot sequence. Part of the boot sequence includes loading MSDOS.SYS into RAM. MSDOS.SYS and the BIOS manage disk files, execute programs, and respond to hardware signals. Further along in the boot sequence, device drivers are loaded to control memory or hardware devices.

Under MS-DOS program files, BIOS, and device drivers cooperate in performing system and hardware functions. Machine specific information is often contained in the BIOS. This machine specific information includes the speed of the floppy drive and how the speed can be changed for a 3-mode floppy drive, whether the cache is turned on or off and how to turn the cache on or off, and many other machine specific pieces of information. Under MS-DOS, a program could simply execute the particular BIOS code to receive and set such machine specific information. However, as operating systems have evolved, more secure multitasking operating systems, such as Microsoft Windows NT™, are designed to prevent direct execution of BIOS code. While direct execution of BIOS code is desirable to provide a more stable multitasking environment where many programs simultaneously share system resources, the information stored in a system's BIOS is still needed and may still need to be executed from time to time. While Windows NT™ prevents execution of the BIOS, it does allow program files to read the BIOS information.

BIOS Use Under Windows NT™

Windows NT™ implements its security and protection capabilities by emulating system BIOS, thus preventing BIOS calls by high-level software programs. However, Windows NT™ is not able to emulate all BIOS calls which may be needed by the high-level software. Other ways have been developed to provide machine specific information on a secure operating system such as Windows NT™ without having the operating system actually execute the BIOS code.

One way an operating system program (or driver) can solve this problem is through a large branch table based on the hardware platform. The branch table could give the operating system program knowledge of every machine it is capable of supporting at the time the branch table is developed. A challenge of this method is that the branch table cannot be forward compatible with hardware developed after the branch table has been released.

A second way an operating system program can receive machine specific information is through implementing pseudo-code in the BIOS that the system is capable of interpreting. A pseudo-code approach allows the BIOS to handle requirements based on the requirements declared in the BIOS. A challenge to this approach, however, is that the pseudo-code and its corresponding interpreter must be robust enough to handle future hardware requirements developed after the pseudo-code and interpreter are released.

What is needed is a solution that allows execution of BIOS functions from a high-level software, especially in cases where Windows NT™ is unable to emulate the particular, often system specific, BIOS routines.

SUMMARY

To address the above-discussed deficiencies of the prior art, the present invention provides a computer system for executing BIOS code on a secure operating system. The computer system includes a processor, memory coupled to the processor, at least one nonvolatile storage device, such as a hard disk drive, a BIOS file stored on the nonvolatile storage device, and a computer program executable by the processor. The computer program is capable of locating BIOS code within the BIOS file and copying the BIOS code to an executable program file stored on the nonvolatile storage device which is executed by the processor. The present invention also provides a method of executing BIOS code on a secure operating system. The method locates the BIOS code within at least one BIOS file, copies the BIOS code to an executable file, and executes the resulting executable file on a processor.

The foregoing is a summary and thus contains, by necessity, simplifications, generalizations and omissions of detail. Those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 1 is a block diagram showing the processing of a BIOS file to produce an executable code file.

FIG. 2 is a chart showing the components used in processing the BIOS file.

FIG. 3 is a flowchart showing the files used for processing the BIOS file.

FIG. 4 is a flowchart showing the processing of the BIOS file to locate the routine identifier.

FIG. 5 is a flowchart showing the processing of the BIOS file to locate the code size entry in the BIOS file for the particular BIOS routine.

FIG. 6 is a flowchart showing the process of reading of the code from the BIOS file and writing the code to the new executable file.

FIG. 7 is a flowchart showing process of cleaning up the opened files and executing the new executable program.

The use of the same reference symbols in different drawings indicates similar or identical items.

DESCRIPTION OF THE PREFERRED EMBODIMENT(S)

The following is intended to provide a detailed description of an example of the invention and should not be taken to be limiting of the invention itself. Rather, any number of variations may fall within the scope of the invention which is defined in the claims following the description.

FIG. 1 shows one example of a BIOS file 100 that is organized for BIOS code processing. In one embodiment, BIOS file 100 is shown as being up to 64K in length, occupying relative addresses 0 to 64K. The 64K length BIOS shown herein is an example implementation. A BIOS file is not limited to a 64K size barrier. Other sizes of BIOS files (i.e., 96K or 128K, etc.) can be used with the computer systems and methods shown herein. During the processing of the BIOS code for execution 110, the BIOS file is opened for read-only access. Under a secured operating system environment, the processing of the BIOS code for execution 110 is prevented from executing or invoking the BIOS code directly by the operating system. BIOS file 100 contains identifiers 120 for various BIOS routines. The identifiers 120 can be anchored to fixed addresses, known numerical values (i.e., 10, 20, 30, etc.), or alpha-numeric tags recognizable by the processing function 110. The identifiers 120 correspond to a pointer 130 which points to the beginning of a code segment located in the BIOS for the particular routine. For example, identifier 120 could be anchored to address 1234h which is pre-established to relate to information regarding the system's cache. Pointer 130 corresponds to identifier 120 and points to an address within BIOS file 100.

In one example, the address pointed to by pointer 130 contains a code size value 140 for the code routine section 150. Processing function 110 reads code 150 and writes the code into an executable code section 180 of a new executable file 160. As will be appreciated by those skilled in the art, other methods exist for determining the size of code 150 to be copied to executable code section 180. These methods include placing a termination value at the end of code 150 to signify the end of the code section, and placing code size 140 along with identifier 120 and pointer 130. In addition, another example is having code 150 follow identifier 120 without need of a pointer value. This example would involve searching through more of BIOS file 100 to find the particular code section 150, but would eliminate the indexing or pointing used with pointer 130.

Processing BIOS code function 110 also includes writing an executable header 170 to the new executable file 160. In many operating systems, including Windows NT™, a header 170 is included with executable files to inform the operating system of the resources required by the executable file so that the operating system can prepare the file for execution. Following the creation of executable file 160, the operating system is called to execute the executable file 160. Because code 150 is no longer associated with BIOS file 100, a secure operating system, such as Windows NT™, will not object to executing executable file 160. BIOS code execution 190 results from the operating system call to executable file 160.

FIG. 2 shows a hierarchy chart for executing BIOS code in a secure operating system environment 200. The first module opens files 300, opens the BIOS file 100 for input, and opens the executable file 160 for output. At this point, the header 170 may be written to executable file 160 or the system can wait to write header 170 until a point after code 150 is copied to executable file 160. After the open files 300 module completes, the find identifier 400 module is invoked to locate a particular identifier in BIOS file 100. Once find identifier 400 module is completed and pointer 130 is located, find code size 500 module is executed to jump to the beginning of the code section and retrieve code size 140. Based on code size 140, the amount of code 150 to be read is known. Read BIOS, write executable 600 module is executed to read code 150 and write the code to executable file 160. Following the read BIOS, write executable module 600, clean up and execute module 700 closes the files and executes executable file 160.

FIG. 3 shows a flowchart for opening the files. Open files 300 causes the BIOS file to be open for input 310. Next, a new executable file is open for output 320. In one example, an executable program header is written to new executable file 330. If any problems are noted, such as the disk being write protected or full, the error is reported back to the calling program and execution is halted. If no errors occur, processing the BIOS file continues with finding the identifier 120.

FIG. 4 shows the processing for finding the identifier 120. Find identifier 400 module is passed the desired identifier 410 from the calling routine. In one example, desired identifier 410 is a known anchor point, or address. In this example, the process can directly index to the given address in BIOS file 100. In other examples, desired identifier 410 is a known value, either numeric or alpha-numeric, which is to be found. In this example, reading BIOS record 420 is performed prior to parsing the BIOS record 430 to isolate the identifier 120 found in BIOS file 100. Comparison 440 of identifier 120 found in BIOS file 100 to desired identifier 410 is performed. If identifier 120 found in BIOS file 100 is not equal to the desired identifier 410, the process loops to read the next BIOS record 420 and continue until either the desired identifier 410 is found or the end-of-file is reached on BIOS file 100. If desired identifier 410 is found at decision 450, the corresponding offset 130 is returned to the calling routine. If desired identifier 410 is not found at decision 450, an error is returned indicating that the desired identifier was not found in BIOS file 100. Find identifier 400 module is terminated at return 490 and control is passed to the calling routine.

FIG. 5 shows code size reading module 500 reading from BIOS file 100. After the offset 130 is located (shown in FIG. 4), code size reading module 500 determines the size by jumping to offset location 520 within BIOS file 100. The BIOS file 100 record is read 530. This record contains a size indicator which may be determined directly or through parsing 540 the BIOS file 100 record. The size is returned to the calling program 550, indicating the amount of code which follows. The size returned is in a measurement of the number of bytes to be read. Code size reading module 500 is terminated at return 590 and control is passed to the calling routine.

FIG. 6 shows code that is executed after code size reading module 500 is completed. Read BIOS, write executable code module 600 initializes read amount variable 610 to zero. The next BIOS file 100 record is read 620 which contains the first line of code for the particular BIOS routine desired by the calling program. Read amount variable 610 is incremented 630 by the size of the BIOS code record. The increment is the number of bytes read consistent with the size read in FIG. 5. The record read is then written 640 to the new executable file 160. Decision 650 compares the total amount read from BIOS file thus far with the size read in FIG. 5. If the read amount variable 610 is less than code size 140, the program iterates to read 620, increment 630, write 640 and compare. This iteration is repeated until the read amount variable 610 is equal to or greater than code size 140. After read amount variable 610 is greater than or equal to code size 140, read BIOS, write executable code module 600 is terminated 690 and control is returned to the calling routine.

FIG. 7 shows clean up and execute module 700 which cleans up the files and executes the newly created executable file 160. BIOS file 100 which has been processed to read the BIOS routine is closed at 710. The new executable file 160 is also closed at 720. Once new executable file 160 is closed, the operating system is called to execute new executable file 160, which in essence is an execution of the BIOS code routine which could not execute due to restrictions imposed by the secure operating system. As numerous new executable files 160 may be possible, optional logic may be implemented to determine whether the new executable file 160 which was executed at 730 should be erased or remain on the user's hard drive. In one embodiment, new executable file 160 could return a return code indicating whether a problem prevented new executable file 160 from terminating properly. Decision 740 analyzes the return code and branches accordingly. If the return code is not zero, i.e., a problem prevented new executable file 160 from terminating properly, the error is reported at 750 and control is passed to the calling routine at 790. If, however, the return code is zero, i.e., new executable file 160 terminated properly, a decision 760 is made whether to erase new executable file 160. An erase_flag or other construct is set depending on whether new executable file should be deleted or remain on the user's hard disk. If the erase_flag is set, new executable file 160 is erased at 770. If the flag is not set, new-executable file 160 remains on the user's hard disk. Clean up and execute module 700 is terminated and control is returned to the calling routine at 790.

Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims.

What is claimed is:

1. In a secure operating system, a method of executing BIOS functions, said method comprising:
   recognizing an identifier of BIOS code to provide an identified BIOS code;
   locating the identified BIOS code within at least one BIOS file;
   reading the identified BIOS code;
   writing the identified BIOS code to an executable file, the executable file operable to be stored on a nonvolatile storage device; and
   executing the executable file.

2. The method, as recited in claim 1, further comprising:
   placing an executable header in the executable file before the executing.

3. The method, as recited in claim 1, further comprising:
   erasing the executable file after the executing.

4. The method, as recited in claim 1, further comprising:
   reading an offset in the at least one BIOS file, wherein the offset indicates the beginning of the BIOS code.

5. The method, as recited in claim 1, further comprising:
   reading a size parameter in the at least one BIOS file, wherein the size parameter indicates the size of the BIOS code.

6. The method, as recited in claim 5, further comprising:
   reading an amount of code from the at least one BIOS file, wherein the amount of code is equal to the size parameter; and
   writing the amount of code to the executable file.

7. The method, as recited in claim 1, wherein the identifier is a fixed address.

8. The method, as recited in claim 1, wherein the identifier is an alpha-numeric field.

9. The method, as recited in claim 1, wherein the at least one BIOS file includes a plurality of identifiers and a plurality of offset pointers, wherein each of the plurality of identifiers correspond to each of the plurality of offset pointers.

10. The method, as recited in claim 1, wherein the at least one BIOS file is a DOS based BIOS file, wherein the DOS based BIOS file is capable of executing in a DOS environment, and wherein the DOS based BIOS file is incapable of executing on the secure operating system.

11. A computer system for executing BIOS code on a secure operating system, said computer system comprising:
   a processor;
   memory operatively coupled to the processor;
   at least one nonvolatile storage device, a BIOS file stored on the at least one nonvolatile storage device;
   a first program stored on a computer-readable medium and executable by the processor, wherein the first program is capable of locating BIOS code within the BIOS file and copying the BIOS code to a second program; and
   the second program stored on the at least one nonvolatile storage device, wherein the second program is capable of being executed by the processor.

12. The computer system, as recited in claim 11, wherein the BIOS file is a DOS based BIOS file, wherein the DOS based BIOS file is capable of executing in a DOS environment, and wherein the DOS based BIOS file is incapable of executing on the secure operating system.

13. The computer system, as recited in claim 11, wherein the second program includes an executable header preceding the BIOS code.

14. The computer system, as recited in claim 11, wherein the first program determines a size of the BIOS code, and wherein the first program copies an amount of the BIOS code to the executable based upon the size.

15. The computer system, as recited in claim 11, wherein the first program erases the second program after the second program has been executed by the processor.

16. The computer system, as recited in claim 11, wherein the BIOS file includes a plurality of identifiers and a plurality of offset pointers, wherein each of the plurality of identifiers correspond to each of the plurality of offset pointers.

17. A computer usable medium for executing BIOS functions in a secure operating system, the computer usable medium comprising:

means for recognizing an identifier of BIOS code;

means for locating the identified BIOS code within at least one BIOS file;

means for reading the identified BIOS code;

means for writing the identified BIOS code to an executable file, the executable file operable to be stored on a nonvolatile storage device; and means for executing the executable file.

18. A computer system for executing BIOS functions in a secure operating system, the computer system comprising:

means for recognizing an identifier of BIOS code;

means for locating the identified BIOS code within at least one BIOS file;

means for reading the identified BIOS code;

means for writing the identified BIOS code to an executable file, the executable file operable to be stored on a nonvolatile storage device; and means for executing the executable file.

* * * * *